(12) United States Patent
Gretz (10) Patent No.: US 8,124,891 B1
(45) Date of Patent: Feb. 28, 2012

(54) DUPLEX ELECTRICAL FITTING WITH ONE-PIECE CONNECTOR BODY FOR SNAP IN CONNECTION OF CABLES

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 226 days.

(21) Appl. No.: 12/661,430

(22) Filed: Mar. 17, 2010

(51) Int. Cl.
*H02G 3/18* (2006.01)

(52) U.S. Cl. ......... 174/659; 174/660; 174/653; 248/56; 285/194; 439/552; 164/137

(58) Field of Classification Search ........... 174/660, 174/655, 653, 659, 658; 439/460, 552; 285/194, 285/921; 248/56; 164/137
See application file for complete search history.

(56) References Cited

U.S. PATENT DOCUMENTS

| | | | |
|---|---|---|---|
| 2,552,149 A * | 5/1951 | Clark et al. ............... | 285/154.3 |
| 6,184,467 B1 * | 2/2001 | Milanowski et al. ......... | 174/655 |
| 6,521,831 B1 | 2/2003 | Gretz | |
| 7,057,107 B2 | 6/2006 | Auray et al. | |
| 7,151,223 B2 | 12/2006 | Auray et al. | |
| 7,161,095 B1 | 1/2007 | Gretz | |
| 7,304,251 B1 | 12/2007 | Gretz | |
| 7,329,144 B1 | 2/2008 | Gretz | |
| 7,358,448 B2 | 4/2008 | Auray et al. | |
| 7,554,041 B2 * | 6/2009 | Ducret .......................... | 174/655 |
| 7,582,831 B2 | 9/2009 | Kiely et al. | |
| 7,786,391 B1 * | 8/2010 | Van Pelt et al. .............. | 174/659 |

* cited by examiner

*Primary Examiner* — Dhirubhai R Patel (57) ABSTRACT

A duplex electrical fitting including a one-piece connector body that is die-cast of metal. The duplex fitting includes a pair of inbound bores on the inbound end and a single outbound bore on the outbound end. Two cable engaging clips are secured to the connector body, one adjacent each of the inbound bores, for engaging and securing an electrical cable in each of the inbound bores. An end stop with a pair of round openings therein stops the forward travel of the cables just before the outbound bore. The outbound end of the connector body includes a cylindrical nose portion and a split cylindrical snap ring for providing positive engagement of the outbound end of the duplex fitting to an electrical box.

20 Claims, 8 Drawing Sheets

DUPLEX ELECTRICAL FITTING WITH ONE-PIECE CONNECTOR BODY FOR SNAP IN CONNECTION OF CABLES

FIELD OF THE INVENTION

This invention relates to fittings for connecting electrical cables to a panel or an electrical box and specifically to a one-piece duplex electrical fitting for snap in connection of electrical cables.

BACKGROUND OF THE INVENTION

Electrical connectors or fittings for the attachment of electrical cables were disclosed in U.S. Pat. Nos. 6,194,661, 6,355,884, 6,521,831, 7,161,095, 7,304,251, and 7,329,144, which are commonly owned by the assignee of the present invention and the contents of which are incorporated herein in their entirety by reference thereto.

As they are used to establish electrical continuity between metal clad cables and a metal electrical box or panel, duplex electrical fittings include connector bodies that are typically constructed of metal to provide a good grounding path between the cable and the box or panel. The most common method of manufacturing metal connector bodies for duplex fittings is by metal die-casting. Heretofore, in order to provide the internal structure of the duplex fitting, the connector bodies are typically constructed in two pieces and then joined together by screws or similar fastening means to form the connector body for the duplex fitting.

Although two-piece connector bodies for duplex fittings have become the industry standard for connecting two metal clad cables to an electrical box or panel, the two-piece construction of the connector body adds significantly to the assembly time and assembly cost as a separate manufacturing step is required to fasten the two pieces together. Therefore, what is needed is a one-piece duplex fitting or connector that eliminates the need for a separate assembly step and thus greatly reduces manufacturing cost.

SUMMARY OF THE INVENTION

The invention is a duplex electrical fitting that includes a one-piece connector body that is die-cast of metal. The duplex fitting includes a pair of inbound bores on the inbound end and a single outbound bore on the outbound end. Two cable engaging clips are secured to the connector body, one adjacent each of the inbound bores, for engaging and securing an electrical cable in each of the inbound bores. An end stop with a pair of round openings therein stops the forward travel of the cables just before the outbound bore. The outbound end of the connector body includes a cylindrical nose portion and a split cylindrical snap ring for providing positive engagement of the outbound end of the duplex fitting to an electrical box.

OBJECTS AND ADVANTAGES

Several advantages are achieved with the duplex electrical fitting of the present invention, including:
(1) The connector body is die-cast in one piece thereby eliminating an extra production step common with two-piece connector bodies and reducing assembly cost.
(2) Round end stop apertures are provided in the end stop portion of the connector body, thereby minimizing damage to conductors from the sharp jacketing on cut MC cable that was common on prior art connectors with oval end stop apertures.
(3) The duplex fitting provides rapid connection of two cables to an electrical box including snap in engagement of electrical cables on the inbound end and snap in engagement of the outbound end to the electrical box.
(4) The connector body, being die-cast in one-piece of metal, provides good electrical continuity between the connected electrical cables, the connector body, and the electrical box it is connected to.

These and other objects and advantages of the present invention will be better understood by reading the following description along with reference to the drawings.

INDEX TO REFERENCE NUMERALS IN DRAWINGS

| | |
|---|---|
| 20 | duplex electrical fitting |
| 22 | connector body |
| 24 | inbound end |
| 26 | outbound end |
| 28 | inbound bore |
| 30 | cable engaging clip |
| 32 | cylindrical nose portion |
| 34 | outbound bore |
| 36 | snap ring |
| 38 | leading flange |
| 40 | trailing flange |
| 42 | seat |
| 44 | side |
| 46 | open channel |
| 48 | bridge |
| 50 | inclined surface |
| 52 | brace member |
| 54 | viewing port |
| 56 | top surface |
| 58 | bottom surface |
| 60 | longitudinal wall |
| 62 | end stop |
| 64 | circular aperture |
| 66 | axial center of inbound bore |
| 68 | flat blank |
| 70 | bend line |
| 72 | semi-circular notch or arcuate surface |
| 74 | second notch |
| 76 | base portion |
| 78a | leading leg |
| 78b | trailing leg |
| 80 | tab |
| 82 | aperture |
| 84 | large radius bend |
| 86 | small radius bend |
| 88 | fastener |
| 90 | locking tang |
| 92 | knockout aperture |
| 94 | electrical box wall |
| 95 | first attachment arrangement |
| 100 | duplex electrical fitting, second embodiment |
| 102 | connector body |
| 104 | locknut |
| 106 | threaded nose portion |
| 107 | second attachment arrangement |
| 108 | electrical cable |
| 110 | electrical conductor |
| 112 | sharp edge of cable |
| $\Theta$ | angle between tabs of cable clip |
| $\Theta 1$ | angle of inclined surface with respect to axis of inbound bore |

DETAILED DESCRIPTION OF THE INVENTION

Figure 1:
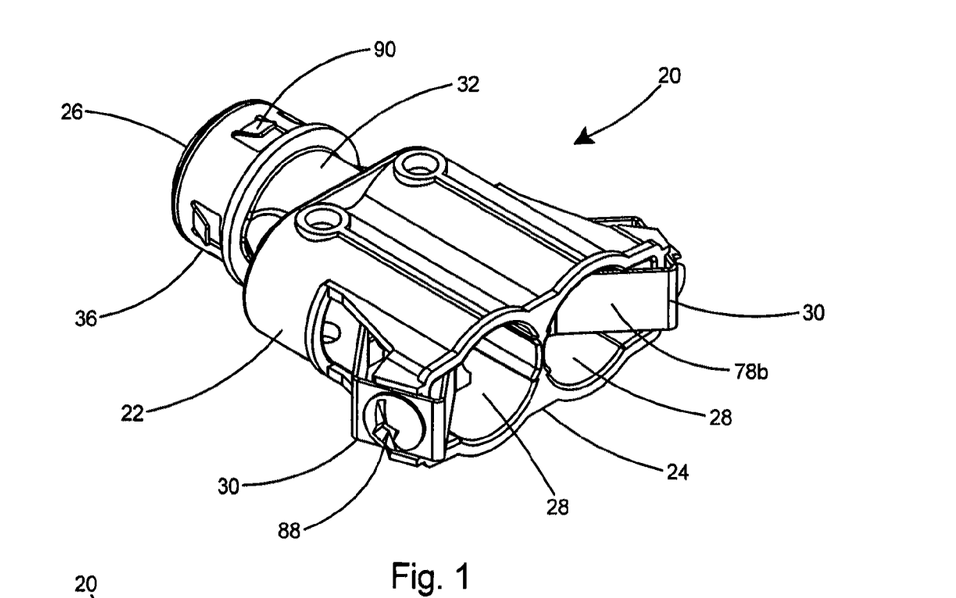
FIG. 1 is a rear perspective view of a preferred embodiment of a duplex electrical fitting with one-piece connector body according to the present invention.
Figure 2:
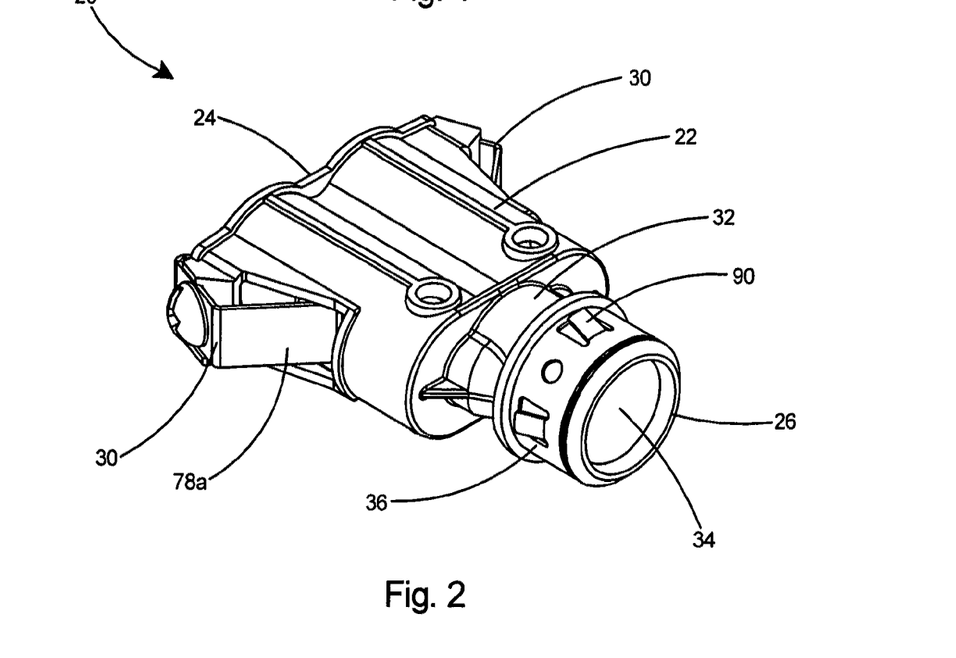
FIG. 2 is a front perspective view of the duplex electrical fitting of FIG. 1.

With reference to FIGS. 1 and 2 there is shown a preferred embodiment of the present invention, a duplex electrical fitting 20 with a one-piece connector body 22 having an inbound end 24 and an outbound end 26. The inbound end 24 of the connector body 22 includes two inbound bores 28 and a cable engaging clip 30 mounted adjacent each of the inbound bores 28. The outbound end 26 of the connector body 22, includes a cylindrical nose portion 32 with a single outbound bore 34 and a cylindrical-shaped split snap ring 36 secured to the nose portion 32.

Figure 3:
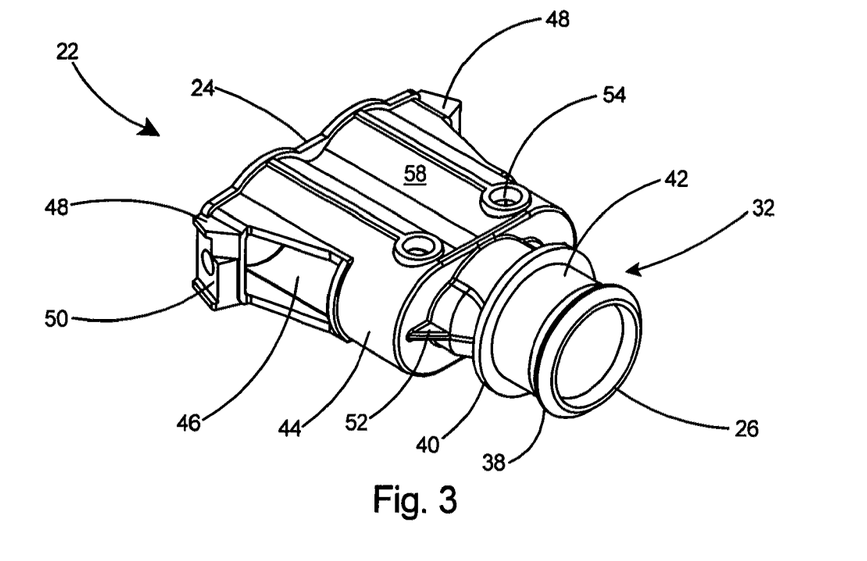
FIG. 3 is a front perspective view of a connector body that forms a portion of the duplex electrical fitting of FIG. 1.
Figure 4:
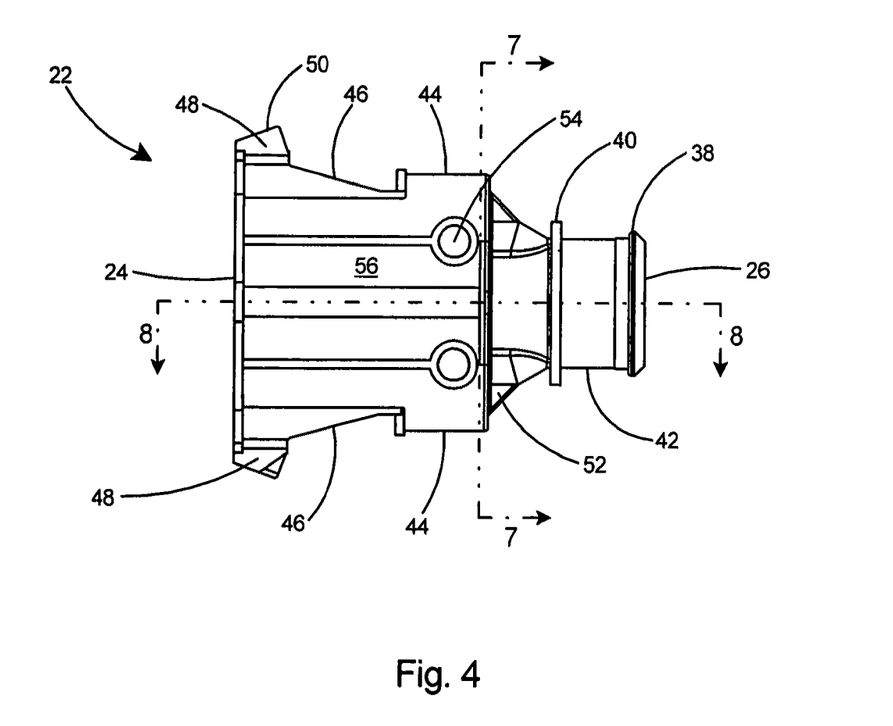
FIG. 4 is a top view of the connector body depicted in FIG. 3.

Referring to FIGS. 3 and 4, the nose portion 32 of the connector body 22 includes a leading flange 38, a trailing flange 40, and a seat 42 defined by a cylindrical surface between the flanges 38 and 40. The connector body 22 further includes two sides 44, an open channel 46 on each side 44, and a bridge 48 extending across the open channel 46 on each side 44 of the connector body 22. The bridge 48 includes an inclined surface 50 and two brace members 52 extend between the connector body 22 and the cylindrical nose portion 32. Two openings or viewing ports 54 are provided on the top 56 and bottom 58 surfaces of the connector body 22.

Figure 5:
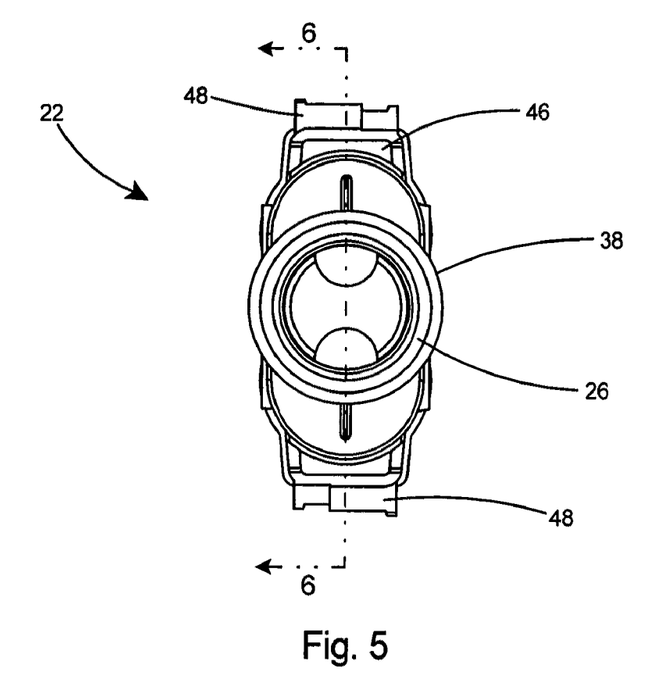
FIG. 5 is a front view of the connector body depicted in FIG. 3.
Figure 6:
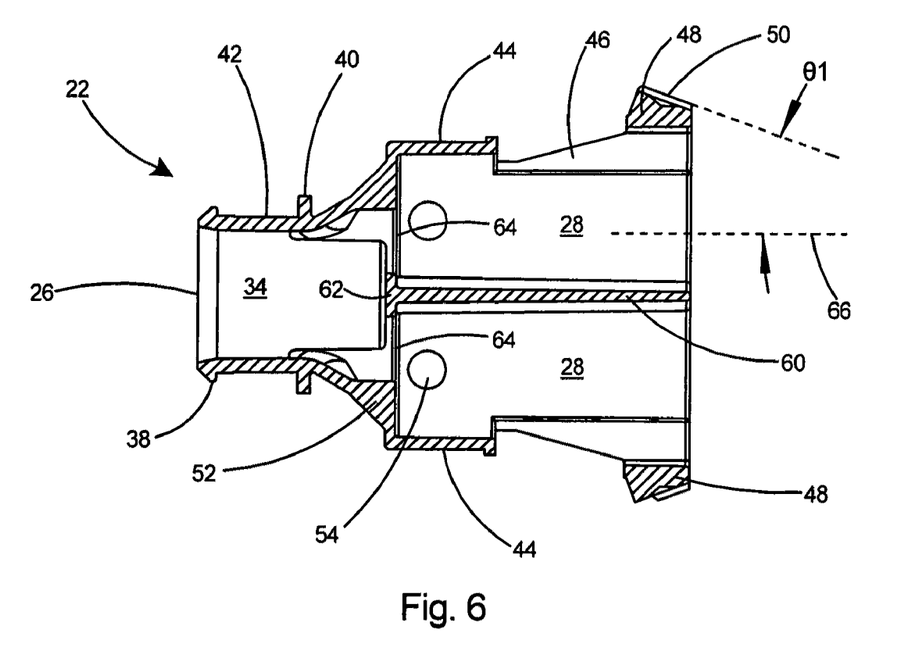
FIG. 6 is a sectional view of the connector body taken along line 6-6 of FIG. 5.
Figure 7:
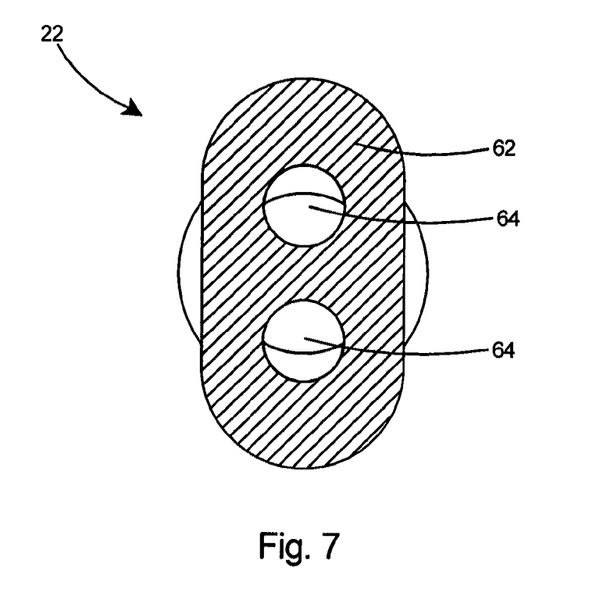
FIG. 7 is a sectional view of the connector body taken along line 7-7 of FIG. 4.
Figure 8:
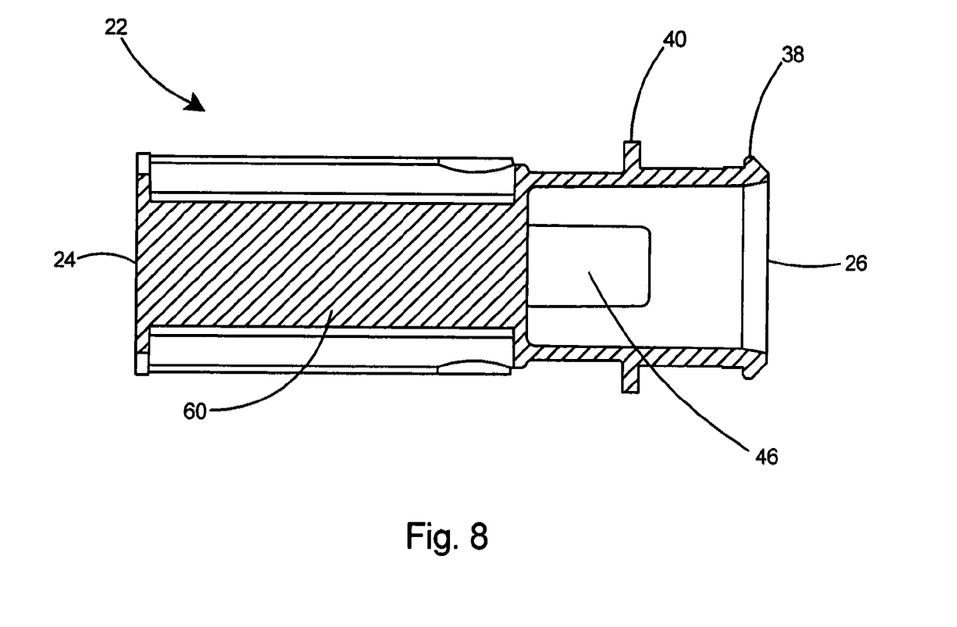
FIG. 8 is a sectional view of the connector body taken along line 8-8 of FIG. 4.

With reference to FIGS. 5 and 6, connector body 22 includes a longitudinal wall 60 providing separation between the two inbound bores 28. Connector body 22 further includes an end stop 62 that will function to stop forward movement of electrical cables as they are inserted into the assembled fitting. As shown the sectional view of the connector body 22 in FIG. 7, the end stop 62 includes circular apertures 64 therein. As forward movement of the inserted electrical cables (not shown) is arrested by the end stop 62, the circular apertures 64 provide an opening for the passage of electrical conductors through the end stop 62. The circular apertures 64 in the end stop 62 are an improvement over the oval apertures of the prior art, which caused damage to conductors in the prior art fittings. As shown in FIG. 6, the inbound bores 28 include axial centers 66 and inclined surface is preferably at an angle $\Theta$ of between 15 and 25 degrees with respect to the axial center 66 of each inbound bore 28. Each open channel 46 is in open communication with the inbound bores 28 on the respective side of the connector body 22.

Figure 9:
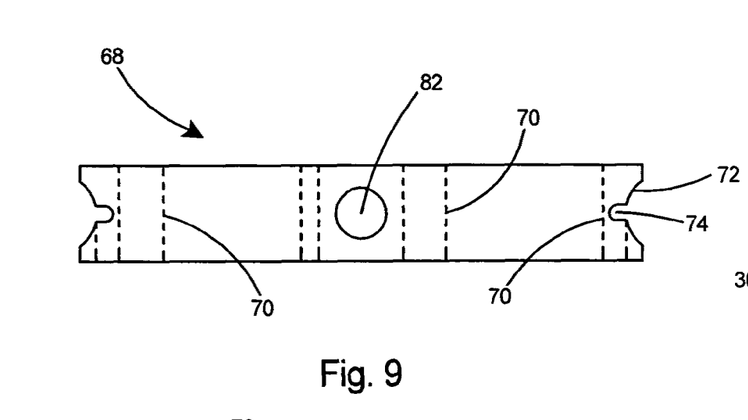
FIG. 9 is a plan view of a blank used to form a cable engaging clip that will form a portion of the duplex fitting of FIG. 1.
Figure 10:
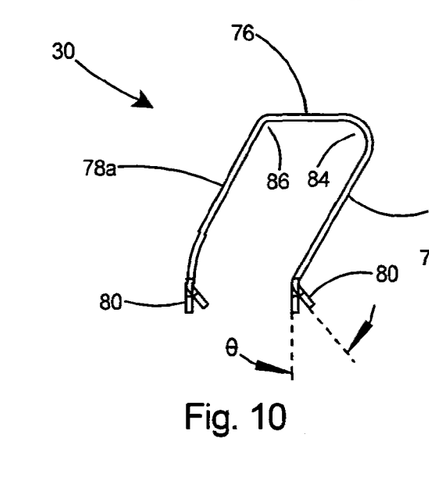
FIG. 10 is a side view of a cable engaging clip that was formed from the blank depicted in FIG. 9.
Figure 11:
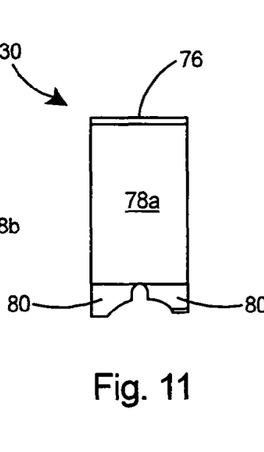
FIG. 11 is an end view of the cable engaging clip depicted in FIG. 10.
Figure 12:
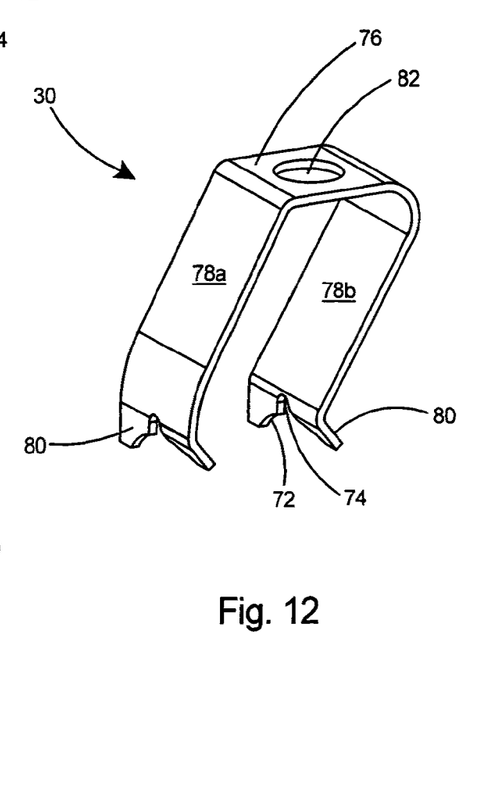
FIG. 12 is a perspective view of the cable engaging clip depicted in FIG. 10.

Referring to FIGS. 9-12, there is shown the preferred embodiment of a cable clip 30 that forms a portion of the duplex electrical fitting 20 of the present invention. The cable clip 30 is preferably formed from a flat blank 68 of spring steel as shown in FIG. 9 and is formed into the cable clip by bending along various bend lines 70. Each end of the blank 68 includes a semi-circular notch 72 and a second notch 74. After being formed into the cable clip 30 as shown in FIGS. 10-12, the clip 30 includes a base portion 76 and two legs including a leading leg 78a and a trailing leg 78b. Tabs 80, defined by the semi-circular notch 72 and the second notch 74, are bent at different angles from the legs 78a and 78b. Base portion 76 includes an aperture 82 therein. Trailing leg 78b is bent away from the base portion 76 with a large radius bend 84 and leading leg 78a is bent away from the base portion 76 with a small radius 86 bend as shown in FIG. 10. The tabs 80 preferably extend from the legs 78a-b at an angle $\Theta 1$ of between 35 and 45 degrees with respect to one another.

Figure 13:
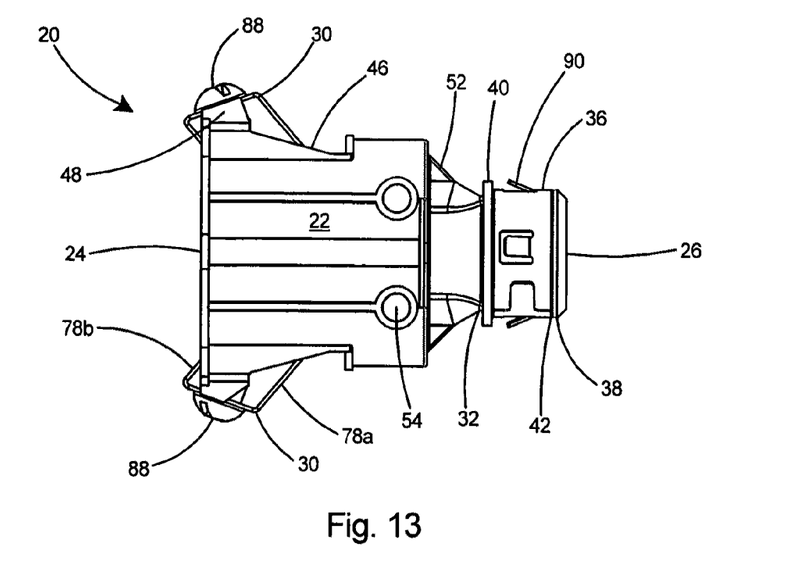
FIG. 13 is a top view of the preferred embodiment of a duplex electrical fitting with one-piece connector body according to the present invention.
Figure 14:
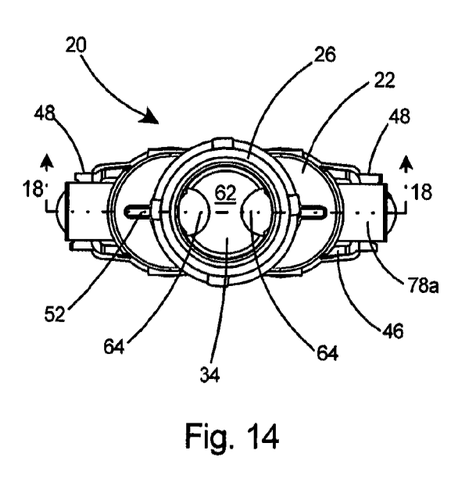
FIG. 14 is a front view of the duplex electrical fitting of FIG. 13.
Figure 15:
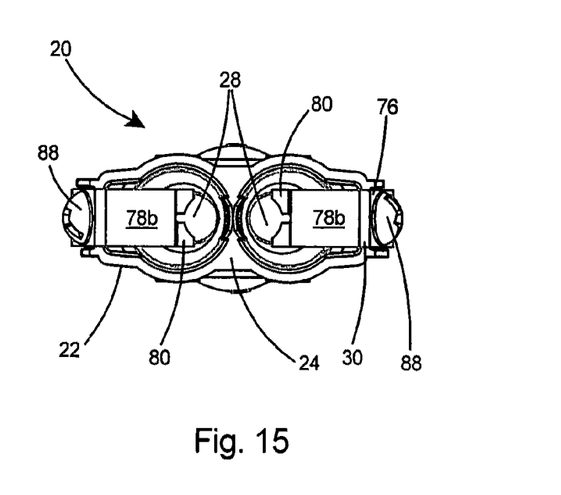
FIG. 15 is a rear view of the duplex electrical fitting of FIG. 13.

The preferred embodiment of the duplex electrical fitting 20, as shown in FIGS. 13-15, includes the one-piece connector body 22 with a cable clip 30 secured by fastener 88 to each bridge 48 at the inbound end 24 of the connector body 22. The outbound end 26 of the connector body 22 includes a cylindrical-shaped split snap ring 36 secured in the seat 42 of the nose portion 32. Snap ring 36 preferably is constructed of spring steel and includes one or more locking tangs 90 bent outwardly from its outer circumference. As shown in FIG. 14, a substantial portion of the circular apertures 64 in the end stop 62 are visible from the outbound end 26 of the connector body 22. As shown in FIG. 15, trailing legs 78b extend into each of the inbound bores 28 at the inbound end 24 of the connector body 22. Tabs 80 extending from legs 78a and 78b engage electrical cables (not shown) as they are inserted within the inbound bores 28.

Figure 16:
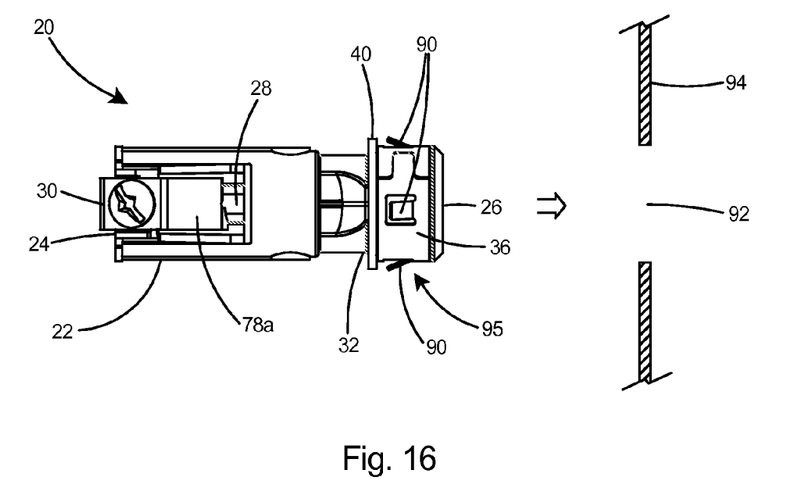
FIG. 16 is a side view of the preferred embodiment of the duplex electrical fitting of the present invention in alignment with an aperture in an electrical box to be secured thereto.

For operation of the present invention, reference is made to FIG. 16. The preferred embodiment of the duplex electrical fitting 20 is shown in alignment with a knockout aperture 92 in an electrical box 94, a portion of which is shown. The duplex electrical fitting 20 is provided as an assembly including a snap ring 36 secured on the seat 42 of the nose portion 32 at the outbound end 26 of the connector body 22 and two cable clips 30, one of which is in view, secured to the inbound end 24 of the connector body 22. To operate the invention, an installer simply pushes the outbound end 26 through the knockout aperture 92, upon which locking tangs 90 will snap outward after clearing electrical box wall 94 and lock the duplex fitting 20 into the wall 94. On the inbound end 24, up to two electrical cables (not shown) are inserted into the inbound bores 28 (see FIG. 6) of the connector body 22. Electrical cables can be inserted either before or after the outbound end 26 of the duplex fitting 20 is secured to the electrical box wall 94. The cylindrical nose portion 32, seat 42, cylindrical shaped split snap ring 36 disposed on the seat 42, and one or more locking tangs 90 extending from the snap ring 36 form a first attachment arrangement 95 for securing the outbound end 26 of the duplex electrical fitting 20 to a knockout aperture 92 in an electrical box wall 94.

Figure 17:
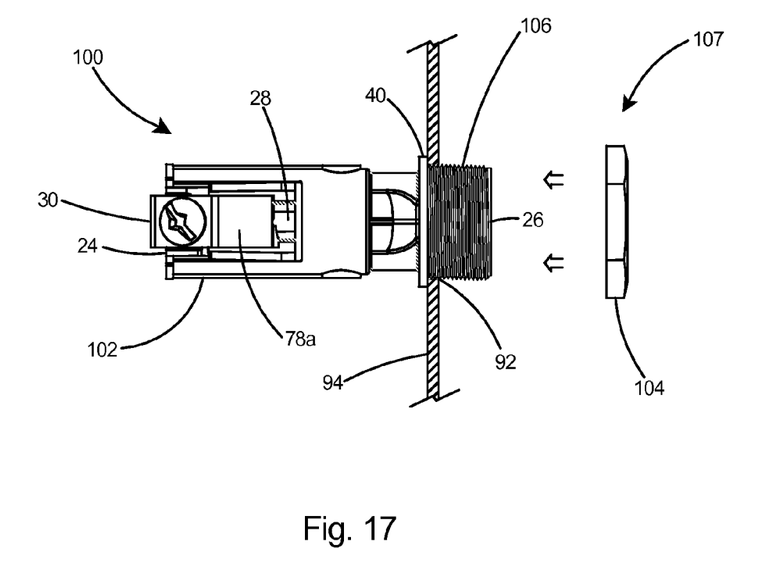
FIG. 17 is a side view of a second embodiment of the duplex electrical fitting including a connector body with a threaded nose portion and a locknut in alignment with an aperture in an electrical box for securing the outbound end of the fitting to a panel or an electrical box.

With reference to FIG. 17, a second embodiment of the duplex electrical fitting 100 is shown inserted into a knockout aperture 92 in an electrical box wall 94. Duplex electrical fitting 100 includes an alternative connector body 102 and an internally threaded locknut 104. Connector body 102 includes a threaded nose portion 106 on the outbound end 26. Duplex electrical fitting 100 is operated by simply pushing the threaded nose portion 106 on the outbound end 26 of the fitting 100 through knockout aperture 92 until trailing flange 40 is flush against the electrical box wall 94, and then screwing locknut 104 tightly onto the threaded nose portion 106. In the same manner as for the first embodiment, electrical cables can be inserted either before or after the outbound end 26 of duplex fitting 100 is secured to the electrical box wall 94. Trailing flange 40 preferably extends transversely beyond the connector body 22 by an amount sufficient to prevent the duplex fitting 20 from entering the knockout opening 92 of the electrical box wall 94 when the outbound end 26 of the connector body 22 is inserted into the knockout opening 92. The threaded nose portion 106 and locknut 104 form a second attachment arrangement 107 for securing the outbound end 26 of the duplex electrical fitting 100 to a knockout aperture 92 in an electrical box wall 94.

Figure 18:
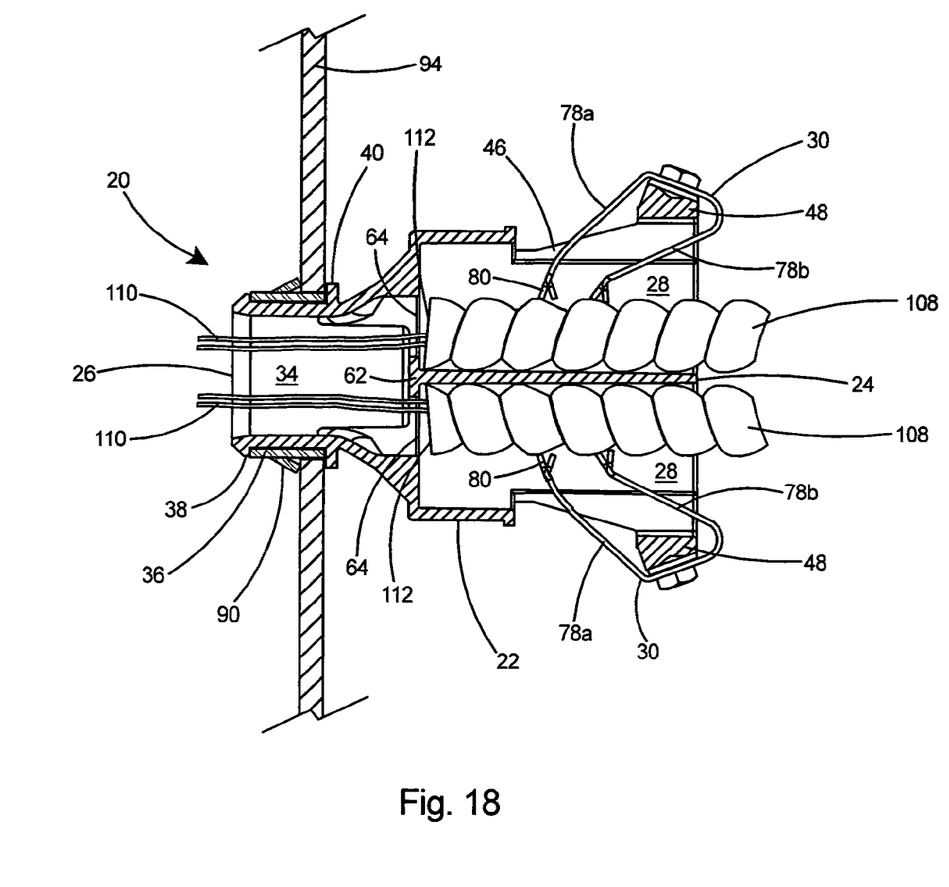
FIG. 18 is a sectional view of the duplex electrical fitting taken along line 18-18 of FIG. 14 and depicting the outbound end of the fitting secured to the wall of an electrical box and with two electrical cables secured to the inbound end.

Referring to FIG. 18, the preferred embodiment of the duplex electrical fitting 20 is shown after being secured to the wall 94 of an electrical box. The outbound end 26 of the fitting 20 is secured to the wall 94 by resilient locking tangs 90 of snap ring 36 engaging one side of wall 94 and trailing flange 40 engaging the second side of wall 94. An electrical cable 108, such as the metal clad cable shown, has been inserted into each of the inbound bores 28 and is held securely therein by leading leg 78a and trailing leg 78b of cable clip 30. The legs 78a-b cable clip 30, being constructed of resilient spring steel, flex as cable 108 is inserted within inbound bore 28, allowing the electrical cable 108 to advance until it engages end stop 62. Circular apertures 64 in end stop 62 enable conductors 110 of each electrical cable 108 to pass there through. The circular apertures 64 are advantageous over prior art oval apertures as the sharp edges 112 of electrical cables 108, which are typically cut by the installer prior to insertion in the duplex fitting 20, have been found to allow damage to the insulation covering the conductors 110. The one-piece construction of the duplex fitting 20 along with intimate metal-to-metal contact between the connector body 22 and the electrical box wall 94 as a result of the tight fit provided by the snap ring 36 and the associate locking tangs 90, enable the duplex fitting 20 to easily meet resistance tests as specified by NASC Standard NMX-J-017-ANCE, section 8.21.3, wherein it is required that metal-clad cable fittings subjected to the resistance test shall have a voltage drop of no greater than 50 millivolts. Prior art duplex fittings are typically die-cast in two pieces that are then assembled together by a screw or similar connector. The one-piece connector body 22 of the duplex fitting 20 provides excellent electrical conductivity between the electrical box, the fitting, and the metal jackets of the metal-clad cables as the one-piece die-cast construction ensures a solid metal conductive path through the fitting. As shown in FIG. 18, the leading leg 78a of each cable clip 30 extends through the open channel 46 into the inbound bore 28 at each side of the connector body 22 and each trailing leg 78b extends directly into the inbound bore 28 at the inbound end 24 of the connector body 22.

The duplex fitting 20 of the present invention furthermore provides excellent pull strength results. As a result of the positive engagement on the outbound end 26 of the fitting provided by the snap ring 36 and locking tangs 90, and the positive engagement of each electrical cable 108 by the tandem legs 78a-b of cable clip 30, any rearward force exerted on cables 108, in order to pull the cables 108 out of the fitting 20 and out of the electrical box wall 94, is strongly opposed. Duplex fitting 20, as a result of positive engagement by locking tangs 90 and legs 78a-b of cable clip 30, easily meets the pull test requirement as specified by NASC Standard NMX-J-017-ANCE, section 8.21.6, wherein it is required that metal-clad cables subjected to the pull force specified by the standard shall not be displaced more than 3.2 mm from its original position.

The connector body 22 of duplex electrical fitting 20 is preferably constructed of a conductive metal such as steel, zinc, galvanized steel, or aluminum. The connector body 22 of the present invention is typically formed by die-casting and die-casting alloys are the most preferred material of construction. A most preferred material of construction for the connector body 22 is Zamak™, a casting alloy comprised mainly of zinc alloyed with aluminum, magnesium, and copper and available from Eastern Alloys, Maybrook, N.Y. By constructing the tubular body of Zamak™ or other appropriate die-casting alloys, the electrical fittings disclosed herein will be electrically conductive and provide good electrical continuity or ground throughout the fitting and between the duplex fitting, the electrical box, and the electrical cables secured thereto.

Referring to FIG. 12, the legs 78a-b of the cable clip 30 are separated by a semicircular notch 72. The semicircular notch 72 is centered on the lower end of each leg 78a, 78b and approximates the outer curvature of the portion of a cable (not shown) that the lower end of the leg 78a, 78b will seat within. The legs 78a-b will typically seat in a groove of the cable (see FIG. 18). Since the electrical fittings of the present invention accommodate several trade sizes of cable, the legs 78a and 78b include an arcuate surface 72 that provides optimal surface contact with each trade size of cable.

The cable clip 30 is preferably constructed of spring steel and is electrically conductive. Constructing the connector body 22 of zinc alloy and the cable clip 30 of spring steel enables the electrical fitting to establish excellent electrical continuity between the metallic-sheathed cable, and the panel or electrical box it is connected to.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A duplex electrical fitting for connecting electrical cable to a panel or electrical box comprising:

a one-piece connector body constructed of metal, said connector body including an inbound end and an outbound end;

two inbound bores in said inbound end of said connector body and a bridge adjacent each of said inbound bores at said inbound end of said connector body;

a nose portion at said outbound end, said nose portion including an outbound bore therein;

an end stop within said connector body dividing said inbound bores from said outbound bore;

two apertures in said end stop, each of said apertures in axial alignment with one of said inbound bores;

an attachment arrangement on said outbound end for securing said electrical fitting to the panel or electrical box; and a resilient cable clip secured to each of said bridges at said inbound end of said connector body, said resilient cable clip capable of engaging and tightly holding an electrical cable within each of said inbound bores.

2. The duplex electrical fitting of claim 1 wherein
said cable clip includes a base portion and two legs extending from said base portion; and
each of said legs including two tabs extending there from.

3. The duplex electrical fitting of claim 2 wherein said connector body includes a longitudinal wall between said inbound bores.

4. The duplex electrical fitting of claim 3 wherein
said base portion of said cable clip includes an aperture therein; and
said aperture in said base portion is capable of receiving a fastener therein for securing said cable clip to said bridge of said connector body.

5. The duplex electrical fitting of claim 3 wherein
said bridge includes an inclined surface;
said inbound bores each include an axial center;
said base portion of said cable clip is secured to said inclined surface; and
said inclined surface is at an angle of between 15 and 25 degrees with respect to the axial center of each of said inbound bores.

6. The duplex electrical fitting of claim 3 wherein
said connector body includes two sides;
an open channel on each of said sides of said connector body; and
said open channels extending between each of said sides and each of said bridges, said open channels in open communication with each of said inbound bores of said connector body.

7. The duplex electrical fitting of claim 6 wherein said cable clips secured to each of said bridges includes
a leading leg and a trailing leg;
said leading legs extend through said open channels of said connector body into said inbound bore; and
said trailing legs extend directly into said inbound bore at said inbound end of said connector body.

8. The duplex electrical fitting of claim 2 wherein
said cable clip is formed from a flat blank of spring steel, said blank including two ends;
each end of said blank including a semi-circular notch and a second notch;

said tabs are defined by said semi-circular notch and said second notch; and
said tabs are bent at different angles from said legs.

9. The duplex electrical fitting of claim 8 wherein said tabs extend from said legs at an angle of between 35 and 45 degrees with respect to one another.

10. The duplex electrical fitting of claim 2 wherein
said legs include a leading leg and a trailing leg; and
said leading leg includes a bend line to direct said tabs towards said electrical cable.

11. The duplex electrical fitting of claim 10 wherein
said trailing leg is bent away from said base portion with a large radius bend; and
said leading leg is bent away from said base portion with a small radius bend.

12. The duplex electrical fitting of claim 1 including a trailing flange on said nose portion.

13. The duplex electrical fitting of claim 1 wherein
said connector body includes a top surface and a bottom surface;
said top surface and said bottom surface include one or more viewing ports therein; and
said viewing ports are adjacent said end stop and said apertures in said end stop.

14. The duplex electrical fitting of claim 1 wherein
said connector body includes a trailing flange extending from said nose portion; and
said trailing flange extends transversely beyond said connector body by an amount sufficient to prevent said duplex electrical fitting from entering into a knockout opening in the electrical box when said outbound end of said connector body is inserted therein into said knockout opening.

15. The duplex electrical fitting of claim 1 wherein said attachment arrangement includes
a seat on said nose portion;
a cylindrical shaped split snap ring disposed on said seat; and
one or more locking tangs extending from said snap ring.

16. The duplex electrical fitting of claim 15 wherein said seat is defined by
a leading flange on said outbound end of said nose portion of said connector body;
a trailing flange on said nose portion of said connector body; and
a smooth cylindrical surface of smaller diameter than said leading flange and said trailing flange.

17. The duplex electrical fitting of claim 1 wherein said attachment arrangement includes
a threaded nose portion on said outbound end of said connector body; and
a locknut for engaging said threaded nose portion.

18. The duplex electrical fitting of claim 1 wherein said connector body is die cast of a metal alloy including zinc.

19. The duplex electrical fitting of claim 1 wherein said cable clip is formed from a flat blank of resilient spring steel.

20. The duplex electrical fitting of claim 1 including a brace member extending between said connector body and said nose portion.

* * * * *